US012389507B2

(12) United States Patent
Fujita et al.

(10) Patent No.: US 12,389,507 B2
(45) Date of Patent: Aug. 12, 2025

(54) CONTROLLER FOR CONTROLLING A LIGHT SOURCE MODULE

(71) Applicant: O2Micro Inc., Santa Clara, CA (US)

(72) Inventors: Naoyuki Fujita, Tokyo (JP); Rong Hu, Beijing (CN); Yung-Lin Lin, Palo Alto (CA)

(73) Assignee: O2Micro Inc., Santa Clara, CA (US)

( * ) Notice: Subject to any disclaimer, the term of this patent is extended or adjusted under 35 U.S.C. 154(b) by 66 days.

(21) Appl. No.: 18/244,163

(22) Filed: Sep. 8, 2023

(65) Prior Publication Data

US 2025/0089139 A1 Mar. 13, 2025

(51) Int. Cl.

| | |
|---|---|
| ***H05B 45/34*** | (2020.01) |
| ***H05B 45/325*** | (2020.01) |
| ***H05B 45/345*** | (2020.01) |
| ***H05B 45/375*** | (2020.01) |
| ***H05B 45/38*** | (2020.01) |
| ***H05B 45/46*** | (2020.01) |
| ***H05B 45/52*** | (2020.01) |

(52) U.S. Cl.

CPC ........... *H05B 45/46* (2020.01); *H05B 45/325* (2020.01); *H05B 45/34* (2020.01); *H05B 45/345* (2020.01); *H05B 45/375* (2020.01); *H05B 45/38* (2020.01); *H05B 45/52* (2020.01)

(58) Field of Classification Search

CPC ........ H05B 45/34; H05B 45/38; H05B 45/46; H05B 45/52; H05B 45/54; H05B 45/325; H05B 45/345; H05B 45/375; H05B 45/385

See application file for complete search history.

(56) References Cited

U.S. PATENT DOCUMENTS

| | | | | |
|---|---|---|---|---|
| 8,044,609 | B2 * | 10/2011 | Liu | H05B 45/347 315/312 |
| 9,351,370 | B2 * | 5/2016 | Malinin | H05B 45/24 |
| 10,721,804 | B2 * | 7/2020 | Chan | H05B 45/347 |
| 11,612,036 | B2 * | 3/2023 | Chiang | H05B 45/54 |
| 2013/0293109 | A1 * | 11/2013 | Cheon | H05B 47/25 315/122 |
| 2016/0044759 | A1 * | 2/2016 | Lai | H05B 45/48 315/186 |
| 2023/0422372 | A1 * | 12/2023 | Takahashi | H05B 45/10 |

* cited by examiner

*Primary Examiner* — Tung X Le

(57) ABSTRACT

A controller for controlling a light source module including a first LED string and a second LED string includes a power input terminal operable for receiving electric power from a boost converter, a power output terminal operable for providing electric power to the light source module through a buck converter, a first input terminal operable for receiving a first pulse width modulation (PWM) signal, a second input terminal operable for receiving a second PWM signal, and a width monitoring terminal operable for receiving a width monitoring signal indicating a duration of a first state of the first PWM signal and a duration of a first state of the second PWM signal. The controller is operable for turning off the light source module if the width monitoring signal is greater than a width threshold signal.

18 Claims, 9 Drawing Sheets

CONTROLLER FOR CONTROLLING A LIGHT SOURCE MODULE

BACKGROUND

A driver monitoring system (DMS) is a vehicle safety system that measures driver alertness to help prevent accidents on the road. A DMS uses a camera installed in the cabin of the vehicle to check for indications of distracted or impaired driving behavior by the driver and issues an alert if it detects a problem. In order to help the camera produce better images, a light source module can be used for illumination. The light source module can include one or more Infra-Red Light-Emitting Diode (IR LEDs) strings. Conventionally, each LED string is controlled by one controller. To control two LED strings, two controllers are needed, which increases costs. In operation, the current of the light source module needs to be adjusted within a proper range to produce enough illumination without being harmful for human eyes. In a conventional method, the current of the light source module is adjusted by changing the resistance of one or more resistors. This conventional method needs to use resistors with uncommon resistance values or use multiple shunt resistors to achieve a desired current magnitude, and so it has limited flexibility and increases costs. For a conventional controller, when regulating the current of the light source module, the fast-changing current will produce electromagnetic interference (EMI) which may cause other electronic devices in the vehicle to malfunction. In addition, to ensure safe operation of the system, any potential short-circuit condition of the light source module needs to be monitored, a large inrush current at a power terminal of the controller needs to be prevented, and the power consumption of the light source module and the controller needs to be monitored and controlled.

SUMMARY

In embodiments, a controller operable for controlling a light source module, including a first Light-Emitting Diode (LED) array and a second LED array, includes a power input terminal operable for receiving electric power from a boost converter, a power output terminal operable for providing electric power to the light source module through a buck converter, a first input terminal operable for receiving a first pulse width modulation (PWM) signal, a second input terminal operable for receiving a second PWM signal, and a width monitoring terminal operable for receiving a width monitoring signal indicating a duration of a first state of the first PWM signal and a duration of a first state of the second PWM signal. The first PWM signal is operable for controlling a first switch coupled in series with the first LED string. The first switch is on if the first PWM signal is in the first state and is off if the first PWM signal is in a second state. The second PWM signal is operable for controlling a second switch coupled in series with the second LED string. The second switch is on if the second PWM signal is in the first state and is off if the second PWM signal is in a second state. The controller is operable for turning off the light source module if the width monitoring signal is greater than a width threshold signal.

In other embodiments, a controller for controlling a light source module comprising a first LED string and a second LED string includes a boost control unit operable for controlling a boost converter, a buck control unit operable for controlling a buck converter, and a brightness limit unit operable for receiving a first PWM signal and a second PWM signal. The first PWM signal is operable for controlling a first switch coupled in series with the first LED string. The first switch is on if the first PWM signal is in a first state and is off if the first PWM signal is in a second state. The second PWM signal is operable for controlling a second switch coupled in series with the second LED string. The second switch is on if the second PWM signal is in a first state and is off if the second PWM signal is in a second state. The brightness limit unit is operable for turning off the light source module if a width monitoring signal indicating a duration of the first state of the first PWM signal and a duration of the first state of the second PWM signal are greater than a width threshold signal indicating a width threshold.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
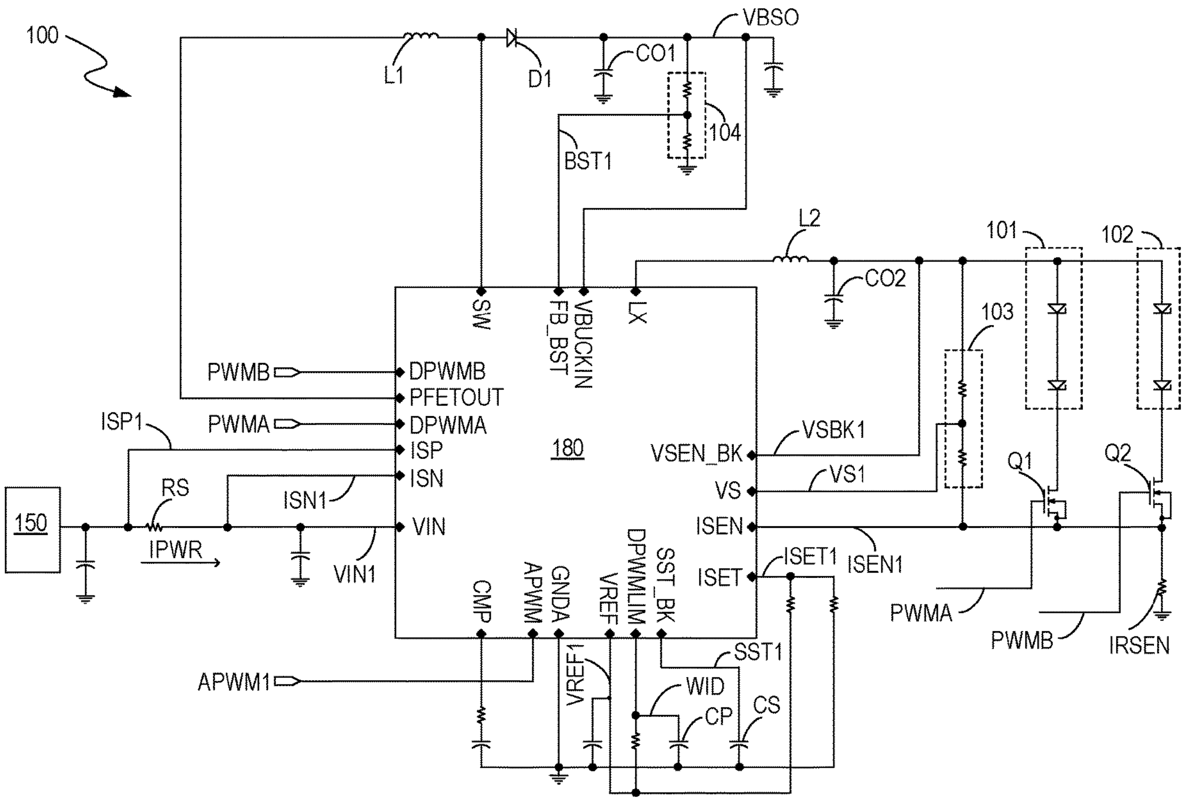
FIG. 1 shows a light source driving circuit for controlling a light source module, in accordance with embodiments of the present invention.

FIG. 1 shows a light source driving circuit 100 for controlling a light source module, in accordance with embodiments of the present invention. The light source driving circuit 100 includes a controller 180.

In the example of FIG. 1, the light source module includes two LED strings 101 and 102, where each LED string includes multiple (e.g., two) LEDs. In an embodiment, the LEDs in the LED strings 101 and 102 are Infra-Red LEDs. This example is used as the basis for the discussion below; however, the invention is not limited to two LED strings and/or two LEDs per string.

Figure 2:
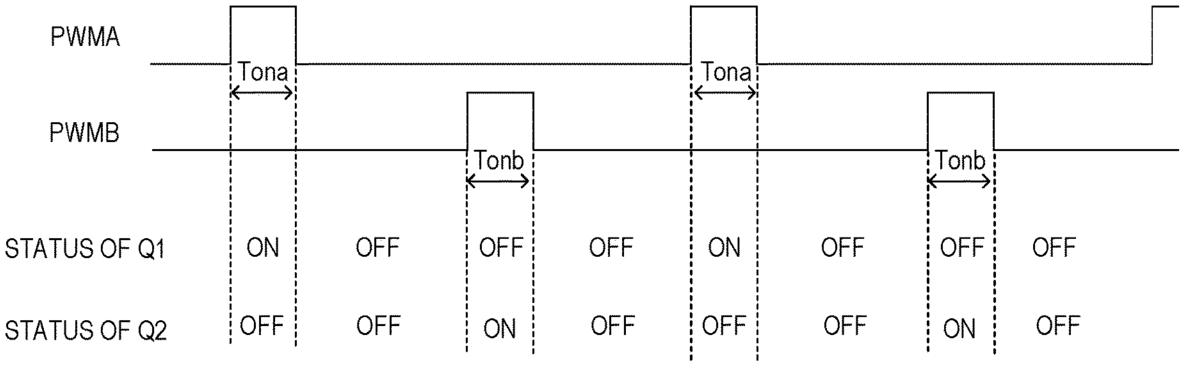
FIG. 2 shows signal waveforms associated with a light source driving circuit, in accordance with embodiments of the present invention.

The controller 180 includes a power input terminal VBUCKIN, a power output terminal LX, a first input terminal, and a second input terminal. The power input terminal VBUCKIN is operable for receiving electric power from a boost converter. The output terminal LX is coupled to the light source module and is operable for providing electric power to the light source module through a buck converter. In the example of FIG. 1, the boost converter includes an inductor L1, a diode D1, an output capacitor CO1, and a transistor 301 (shown in FIG. 3). The buck converter includes an inductor L2, an output capacitor CO2, and transistors 302 and 303 (shown in FIG. 3). The first input terminal DPWMA is operable for receiving a first pulse width modulation (PWM) signal PWMA. The second input terminal DPWMB is operable for receiving a second PWM signal PWMB. In one embodiment, the first and second PWM signals PWMA and PWMB are provided by an Electronic Control Unit (ECU) of a vehicle. The first PWM signal PWMA is operable for controlling a first switch Q1 coupled in series with the first LED string 101. The first switch Q1 is on if PWMA is in a first state (e.g., logic high) and is off if PWMA is in a second state (e.g., logic low). The second PWM signal PWMB is operable for controlling a second switch Q2 coupled in series with the second LED string 102. The second switch Q2 is on if PWMB is in a first state (e.g., logic high) and is off if PWMB is in a second state (e.g., logic low). PWMA and PWMB are configured in a way that the first switch Q1 and the second switch Q2 do not turn on at the same time. As shown in FIG. 2, during time period Tona, PWMA is in the first state and the switch Q1 is on. During time period Tonb, PWMB is in the first state and the switch Q2 is on. With such a configuration, the period of time (Tona) that the switch Q1 is on and the period of time (Tonb) that the switch Q2 is on do not overlap. In one embodiment, PWMA and PWMB have a same duty cycle and a different phase. In other words, in such an embodiment, Tona equals Tonb, and the waveform of PWMB is a time-delayed version of the waveform of PWMA.

The controller 180 further includes a width monitoring terminal DPWMLIM, a current sensing terminal ISEN, a first voltage sensing terminal VS, a second voltage sensing terminal VSEN_BK, a dimming terminal APWM, a soft start terminal SST_BK, a power terminal PFETOUT, a third voltage sensing terminal FB_BST, sensing terminals ISP and ISN, and a reference voltage terminal VREF.

The width monitoring terminal DPWMLIM is operable for receiving a width monitoring signal WID indicating the duration Tona of the first state of the first PWM signal PWMA and the duration Tonb of the first state of the second PWM signal PWMB. The controller 180 is operable for turning off the light source module if the width monitoring signal WID is greater than a width threshold signal. The width monitoring terminal DPWMLIM is coupled to a capacitor CP.

The current sensing terminal ISEN is coupled to a sensing resistor IRSEN. The sensing resistor IRSEN is coupled to a cathode of the first LED string 101 through the switch Q1 and to a cathode of the second LED string 102 through the switch Q2. The sensing terminal ISEN is operable for receiving a current sensing signal ISEN1 from the sensing resistor IRSEN. The current sensing signal ISEN1 is a voltage across the sensing resistor IRSEN and can indicate a magnitude (level) of a current of the first LED string 101 and a magnitude of a current of the second LED string 102. If the switch Q1 is on, the current of the first LED string 101 flows from the buck converter through the first LED string 101, the switch Q1 and a sensing resistor IRSEN to the ground. If the switch Q2 is on, the current of the second LED string 102 flows from the buck converter through the second LED string 102, the switch Q2 and the sensing resistor IRSEN to the ground. Advantageously, the controller 180 is operable for sensing magnitudes of the currents of both LED string 101 and 102 through a single current sensing terminal ISEN, and operable for regulating the currents accordingly. In comparison to a conventional controller that can only monitor and control one LED string, the controller 180 according to present invention can monitor and control multiple (e.g., two) LED strings. These LED strings can be placed in different locations in the vehicle cabin to provide illumination from different angles, so that driver conditions can be better monitored by the driver monitoring system.

The first voltage sensing terminal VS is coupled to an anode of the light source module (e.g., the anodes of the first and second LED strings 101 and 102) through a voltage divider 103, and is operable for receiving a first voltage sensing signal VS1 indicating a level of a voltage at the anode of the light source module. The current sensing signal ISEN1 can further indicate a level of a voltage at a cathode of the light source module. The second voltage sensing terminal VSEN_BK is coupled to the anode of the light source module and is operable for receiving a second voltage sensing signal VSBK1 indicating a level of a voltage drop across the light source module. The controller 180 is operable for detecting a short-circuit condition based on the first voltage sensing signal VS1, the second voltage sensing signal VSBK1, and the current sensing signal ISEN1; this is discussed further in conjunction with FIG. 5.

Figure 3:
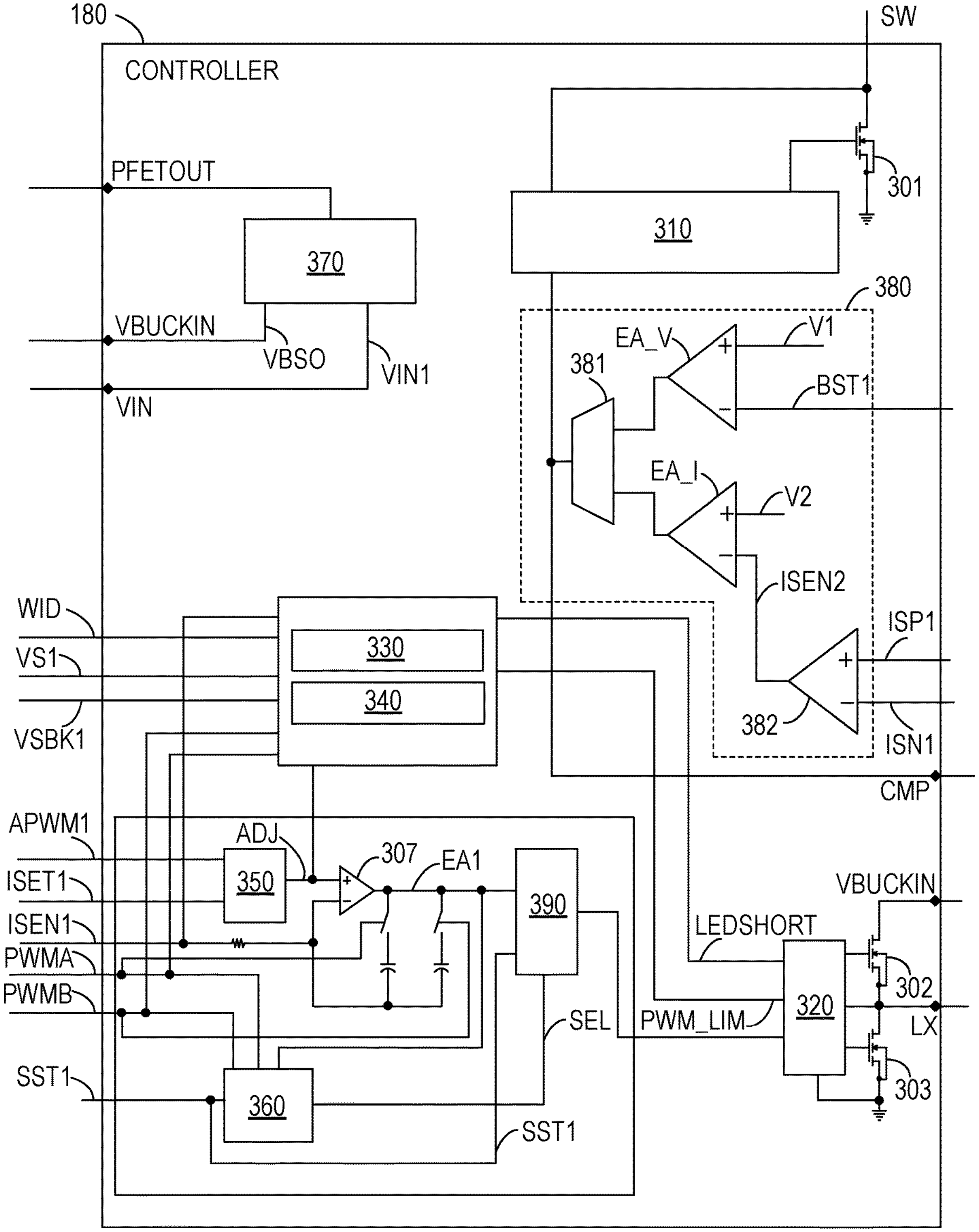
FIG. 3 shows a block diagram of a controller for controlling a light source module, in accordance with embodiments of the present invention.

The dimming terminal APWM is operable for receiving a third PWM signal APWM1. The controller 180 is operable for generating an analog signal ADJ based on a duty cycle of the third PWM signal APWM1, and for regulating the current of the first LED string 101 and the current of the second LED string 102 by comparing the analog signal ADJ with the current sensing signal ISEN1. As shown in FIG. 3, the controller 180 includes an amplifier 307 for comparing the analog signal ADJ with the current sensing signal ISEN1 to generate an error signal EA1. A buck control unit 320 is operable for controlling the buck converter to regulate the current of the first LED string 101 and the current of the second LED string 102 according to a level of the error signal EA1.

With reference again to FIG. 1, the soft start terminal SST_BK is coupled to a capacitor CS and is operable for generating a soft start signal SST1 by charging and discharging the capacitor CS. The controller 180 is operable for regulating the current of the first LED string 101 based on a voltage of the soft start signal SST1 if the voltage of the soft start signal SST1 is less than the error signal EA1 when the switch Q1 is turned on. The controller 180 is operable for regulating the current of the first LED string 101 based on the voltage of the soft start signal SST1 when the switch Q1 is turned off.

The power terminal PFETOUT is coupled to the output capacitor CO1 of the boost converter and is operable for providing a current for charging the output capacitor CO1, and this charging current is regulated according to a voltage at the power input terminal VBUCKIN.

Figure 9:
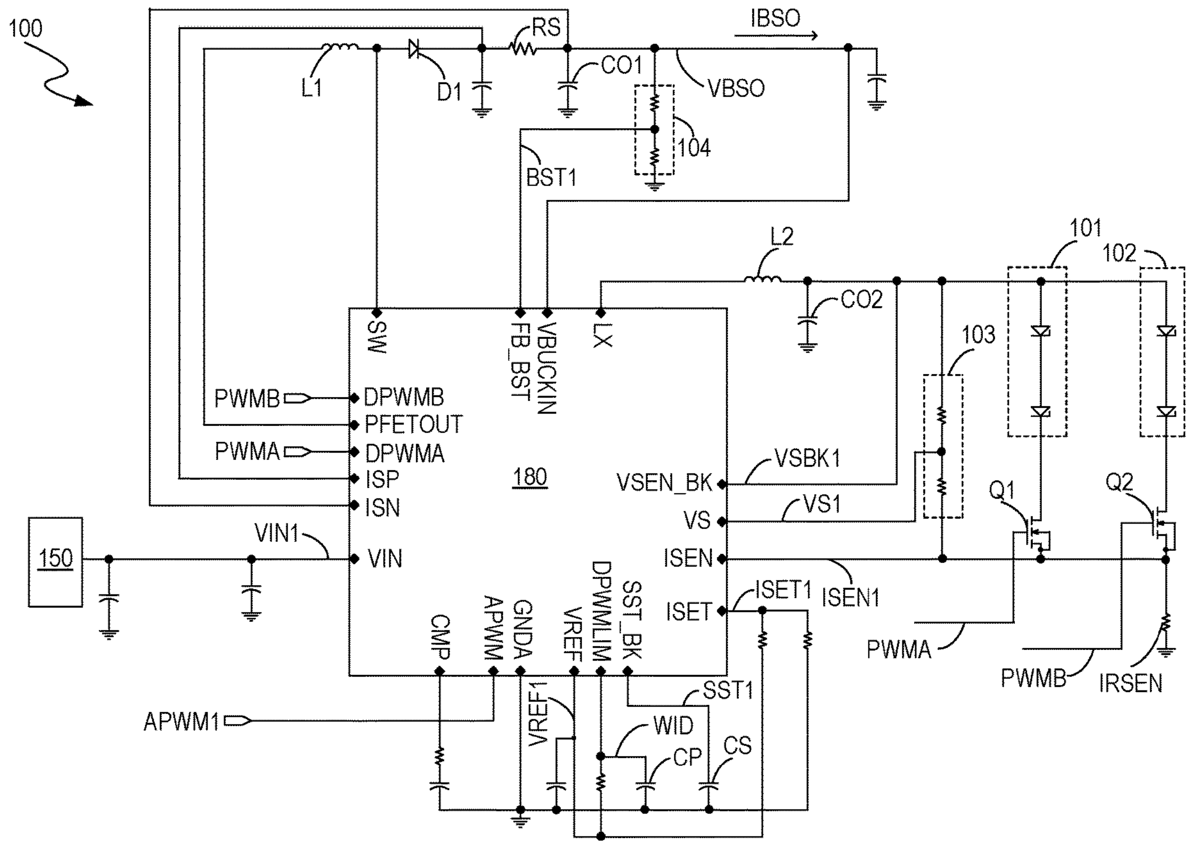
FIG. 9 shows a light source driving circuit for controlling a light source module, in accordance with embodiments of the present invention.

The third voltage sensing terminal FB_BST is coupled to an output terminal of the boost converter through a voltage divider 104 and is operable for sensing a level of an output voltage VBSO of the boost converter. Specifically, the third voltage sensing terminal FB_BST receives a voltage sensing signal BST1 indicating a level of the output voltage VBSO. Sensing terminals ISP and ISN are coupled to two ends of a sensing resistor RS and are operable for sensing an input current IPWR provided by a power source 150 and received by the controller 180 through a power terminal VIN. The sensing resistor RS is coupled between the power source 150 and the controller 180. The controller 180 is operable for controlling the boost converter to regulate the output voltage VBSO to be below a voltage threshold, and for controlling the boost converter to regulate the input current IPWR to be below a current threshold. Alternatively, in another embodiment as shown in FIG. 9, the sensing resistor RS is coupled between the diode D1 of the boost converter and the output capacitor CO1 of the boost converter. The sensing terminals ISP and ISN, which are coupled to the two ends of the sensing resistor RS, are operable for sensing a magnitude of an output current IBSO of the boost converter. The controller 180 is operable for controlling the boost converter to regulate the output voltage VBSO to be below a voltage threshold, and controlling the boost converter to regulate the output current IBSO to be below a current threshold.

FIG. 3 shows a block diagram of a controller 180 for controlling a light source module (e.g., the LED strings 101 and 102 of FIG. 1), in accordance with embodiments of the present invention. The controller 180 includes a boost control unit 310, a buck control unit 320, a brightness limit unit 330, a protection unit 340, a dimming unit 350, a soft start unit 360, an inrush current control unit 370, and a power limit unit 380. The boost control unit 310 is operable for controlling the boost converter by controlling the transistor 301. The buck control unit 320 is operable for controlling the buck converter by controlling the transistors 302 and 303. More specifically, the boost control unit 310 is operable for adjusting the output current IBSO and the output voltage VBSO of the boost converter by adjusting a duty cycle of the transistor 301. The buck control unit 320 is operable for adjusting an output current and an output voltage of the buck converter by controlling duty cycles of the transistors 302 and 303.

Figure 4:
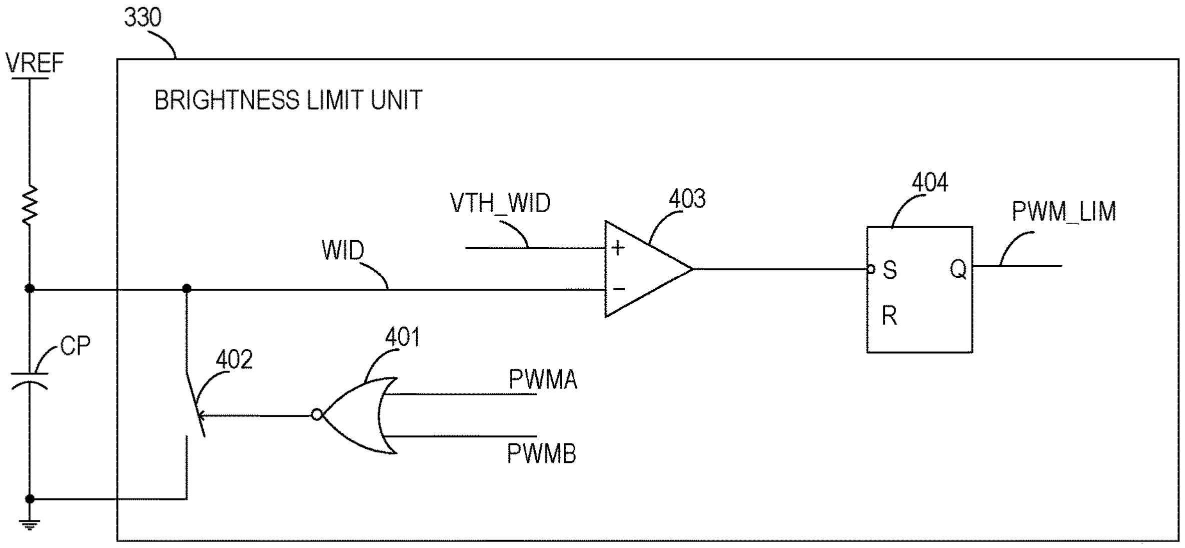
FIG. 4 shows a circuit diagram of a brightness limit unit in a controller for controlling a light source driving circuit, in accordance with embodiments of the present invention.

FIG. 4 shows a circuit diagram of the brightness limit unit 330, in accordance with embodiments of the present invention. The brightness limit unit 330 includes a NOR gate 401, a switch 402, a comparator 403, and a flip-flop 404. The NOR gate 401 receives PWMA and PWMB and provides an output signal to control the switch 402. The switch 402 is coupled in parallel with the capacitor CP. If either PWMA or PWMB is in the first state (e.g., logic high), then the switch 402 is turned off, and the capacitor CP is charged by a current provided by the reference voltage terminal VREF. If both PWMA and PWMB are in the second state (e.g., logic low), then the switch 402 is turned on, and the capacitor CP is discharged. A voltage across the capacitor CP is the width monitoring signal WID, which indicates the duration Tona of the first state of the first PWM signal PWMA and the duration Tonb of the first state of the second PWM signal PWMB. The comparator 403 compares the width monitoring signal WID with a width threshold signal VTH_WID that indicates a width (duration) threshold, and outputs a comparison result to the flip-flop 404. The flip-flop 404 is operable for generating an alert signal based on an output of the comparator 403. If the width monitoring signal WID is greater than the width threshold signal VTH_WID, then the flip-flop 404 outputs the alert signal PWM_LIM having a first state (e.g., logic high) and the controller 180 is operable for turning off the light source module accordingly. As both PWMA and PWMB are used to control the switches Q1 and Q2, the overall brightness of the light source module is proportional to the duration Tona and Tonb. Advantageously, the brightness of the light source module can be limited within a range that will not be harmful for human eyes.

Figure 5:
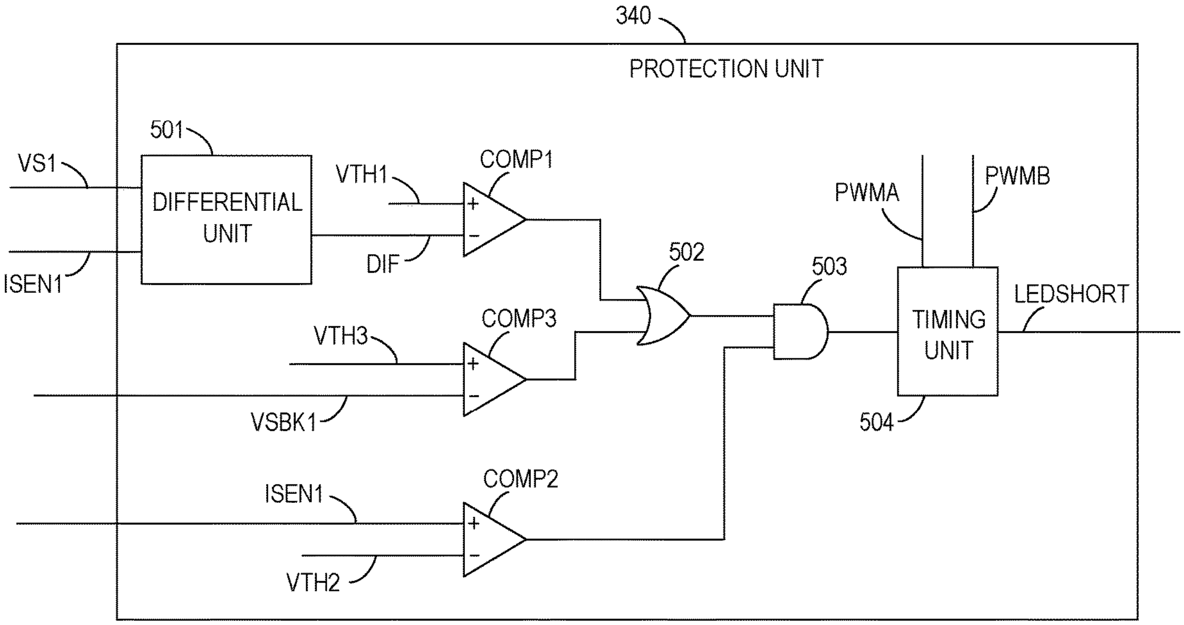
FIG. 5 shows a circuit diagram of a protection unit in a controller for controlling a light source driving circuit, in accordance with embodiments of the present invention.

FIG. 5 shows a circuit diagram of the protection unit 340, in accordance with embodiments of the present invention. The protection unit 340 is operable for detecting a short-circuit condition of the light source module (e.g., the LED strings 101 and 102 of FIG. 1) based on the first voltage sensing signal VS1, the second voltage sensing signal VSBK1, and the current sensing signal ISEN1. The first voltage sensing signal VS1 indicates a level of a voltage at an anode of the light source module, the second voltage sensing signal VSBK1 indicates a level of a voltage drop across the light source module, and the current sensing signal ISEN1 further indicates a level of a voltage at a cathode of the light source module. The protection unit 340 includes a differential unit 501, a first comparator COMP1, a second comparator COMP2, a third comparator COMP3, an OR gate 502, an AND gate 503, and a timing unit 504. The differential unit 501 is operable for generating a differential signal DIF indicating a difference between the first voltage sensing signal VS1 and the current sensing signal ISEN1. The first comparator COMP1 is operable for comparing the differential signal DIF with a first protection threshold VTH1. The second comparator COMP2 is operable for comparing the current sensing signal ISEN1 with a second protection threshold VTH2. The third comparator COMP3 is operable for comparing the second voltage sensing signal VSBK1 with a third protection threshold VTH3. The OR gate 502 is operable for performing an OR operation of an output of the first comparator COMP1 and an output of the third comparator COMP3. The AND gate 503 is operable for performing an AND operation of an output of the OR gate 502 and an output of the second comparator COMP2. The timing unit 504 is operable for generating an alert signal LEDSHORT based on an output of the AND gate 503, the first PWM signal PWMA, the second PWM signal PWMB, and a predetermined time duration TP. In operation, the protection unit 340 monitors whether the current sensing signal ISEN1 is greater than the second protection threshold VTH2. If the current sensing signal ISEN1 is greater than the second protection threshold VTH2, then the protection unit 340 further detects if the differential signal DIF is less than the first protection threshold VTH1 or if the second voltage sensing signal VSBK1 is less than the third protection threshold VTH3. If the differential signal DIF is less than the first protection threshold VTH1, or if the second voltage sensing signal VSBK1 is less than the third protection threshold VTH3, then the protection unit 340 monitors a duration of such state using the timing unit 504. If a time duration of such state is greater than the predetermined time duration TP, then the timing unit 504 generates the alert signal LEDSHORT indicating a short-circuit condition has occurred, and the controller 180 is operable for turning off the light source module accordingly.

Figure 6A:
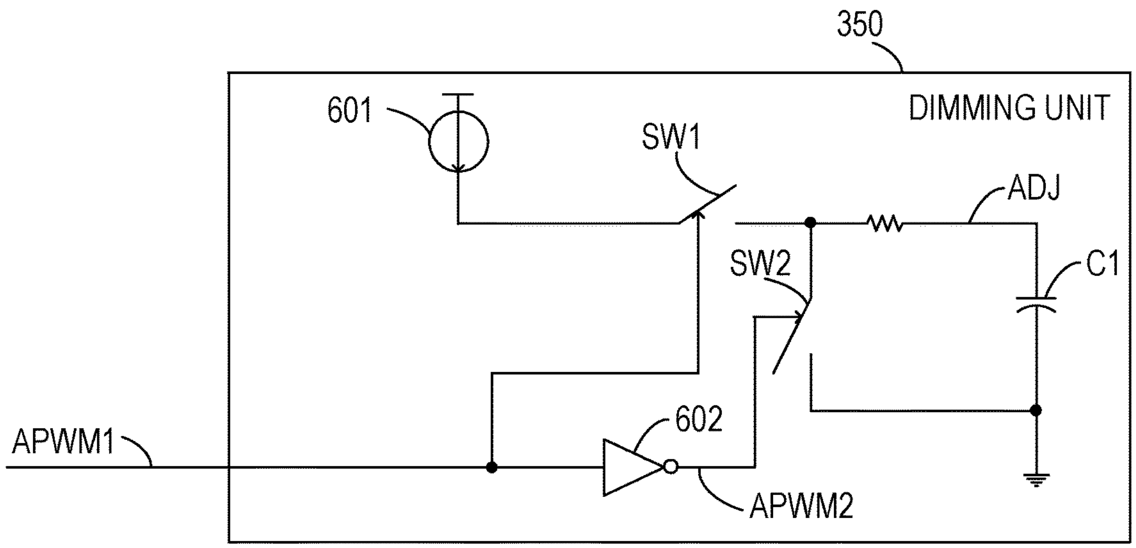
FIG. 6A shows a circuit diagram of a dimming unit in a controller for controlling a light source module, in accordance with embodiments of the present invention.

FIG. 6A shows a circuit diagram of the dimming unit 350, in accordance with embodiments of the present invention. The dimming unit 350 includes a capacitor C1 for generating an analog signal ADJ based on a duty cycle of the third PWM signal APWM1. The capacitor C1 is charged if APWM1 is in a first state, and is discharged if APWM1 is in a second state. More specifically, an inverter 602 generates an inverted PWM signal APWM2 based on the third PWM signal APWM1. The third PWM signal APWM1 controls a switch SW1 coupled between a current source 601 and the capacitor C1. The inverted PWM signal APWM2 controls a switch SW2 coupled in parallel with the capacitor C1. If APWM1 is in the first state (e.g., logic high), then the switch SW1 is on, the switch SW2 is off, and the capacitor C1 is charged by a current from the current source 601. If APWM1 is in the second state (e.g., logic low), then the switch SW2 is on, the switch SW1 is off, and the capacitor C1 is discharged. A voltage across the capacitor C1 is the analog signal ADJ, where a level of the analog signal ADJ is proportional to a duty cycle of the third PWM signal APWM1. The controller 180 is operable for regulating the current of the first LED string 101 and the current of the second LED string 102 by comparing the analog signal ADJ with the current sensing signal ISEN1.

As shown in FIG. 3, the controller 180 includes an amplifier 307 for comparing the analog signal ADJ with the current sensing signal ISEN1 to generate an error signal EA1. The error signal EA1 is delivered to the buck control unit 320 through a multiplexer 390. The buck control unit 320 is operable for regulating the current of the first LED string 101 and the current of the second LED string 102 by controlling duty cycles of the transistors 302 and 303 based on a voltage of the error signal EA1. Advantageously, the brightness of the light source module can be adjusted by the third PWM signal APWM1, while the resistance of the sensing resistor IRSEN coupled to the current sensing terminal ISEN can be fixed or selected among several standard resistance values to reduce manufacturing costs.

Figure 6B:
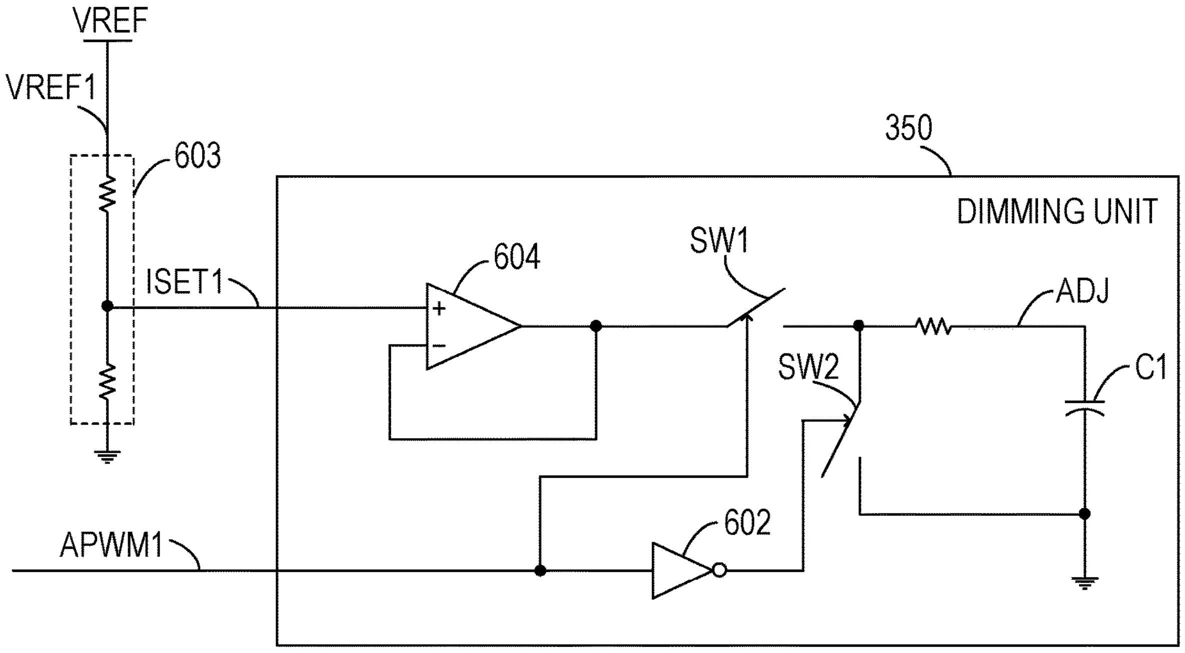
FIG. 6B shows a circuit diagram of a dimming unit in a controller for controlling a light source module, in accordance with embodiments of the present invention.

FIG. 6B shows another embodiment of a circuit diagram of the dimming unit 350. In this embodiment, the controller 180 further includes a current setting terminal ISET (shown in FIG. 1) for receiving a setting signal ISET1. The setting signal ISET1 is generated by a voltage divider 603 based on a voltage of a reference voltage signal VREF1 provided by the reference voltage terminal VREF. The dimming unit 350 includes an amplifier 604 for generating a charging current for the capacitor C1 based on a voltage of the setting signal ISET1. As such, the analog signal ADJ can be further adjusted by changing the resistance ratio of the voltage divider 603. Accordingly, the brightness of the light source module can be further adjusted by configuring the voltage divider 603. Advantageously, the controller 180 according to the present invention can satisfy different application requirement (e.g., light source module with a different type or different number of LEDs).

Figure 7:
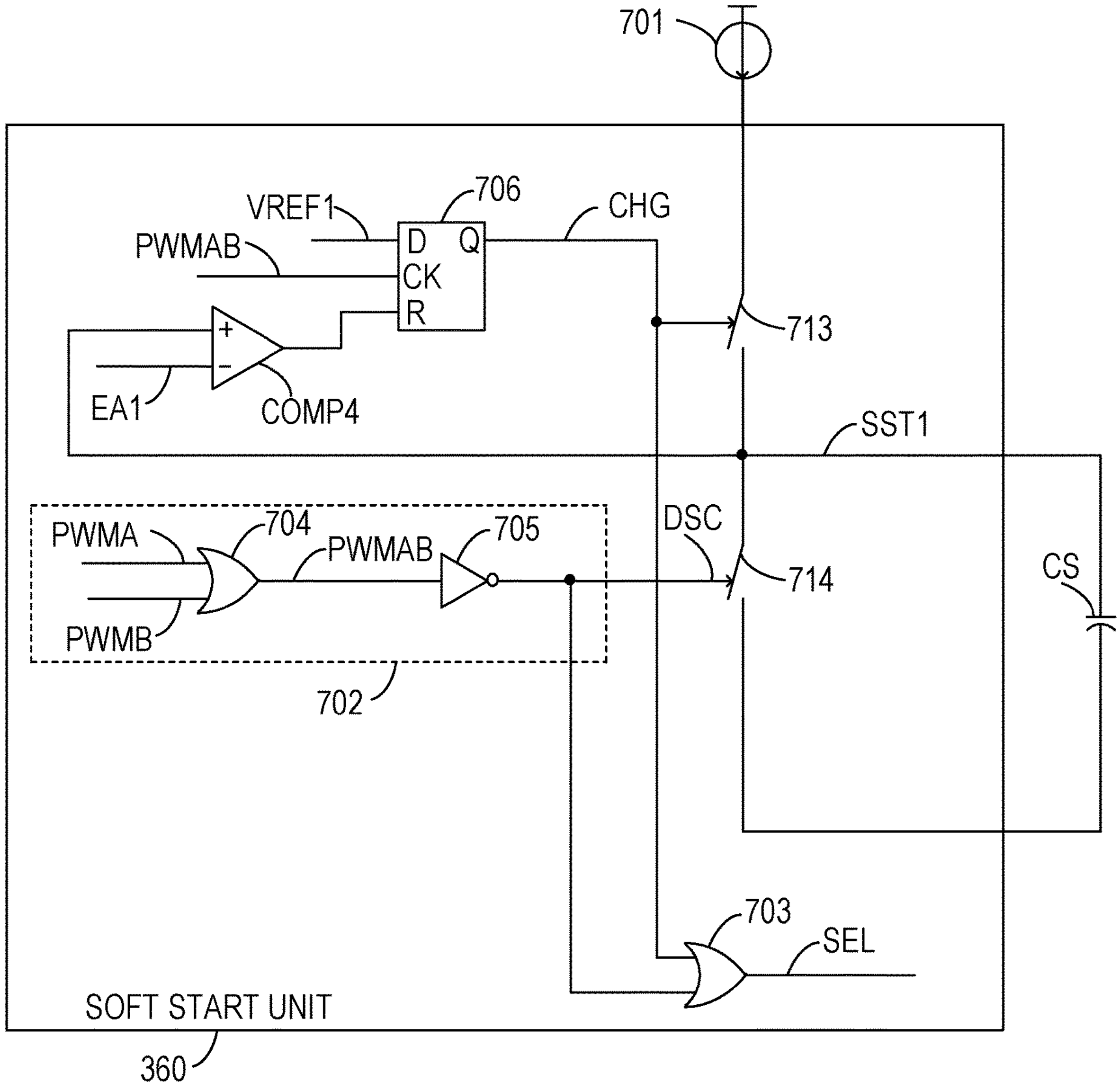
FIG. 7 shows a circuit diagram of a soft start unit in a controller for controlling a light source module, in accordance with embodiments of the present invention.

FIG. 7 shows a circuit diagram of the soft start unit 360, in accordance with embodiments of the present invention. The soft start unit 360 is operable for generating a soft start signal SST1 by charging and discharging a second capacitor CS, where the soft start signal SST1 is a voltage across the second capacitor CS. The soft start unit 360 includes a discharging unit 702, a comparator COMP4, a flip-flop 706, and an OR gate 703. The discharging unit 702 is operable for generating a discharging control signal DSC based on the first PWM signal PWMA and the second PWM signal PWMB. In one embodiment, the discharging unit 702 includes an OR gate 704 for generating a signal PWMAB by performing an OR operation of PWMA and PWMB, and an inverter 705 for generating the discharging control signal DSC based on the signal PWMAB. The discharging control signal DSC is operable for turning on a switch 714 coupled in parallel with the capacitor CS to discharge the capacitor CS. The comparator COMP4 is operable for comparing the error signal EA1 with the soft start signal SST1. The flip-flop 706 receives the output of the comparator COMP4 at the R terminal, and generates the charging control signal CHG based on the output of the comparator COMP4 at the Q terminal. The charging control signal CHG is operable for turning on a switch 713 coupled between the capacitor CS and a power source 701 to charge the capacitor CS. In one embodiment, the power source 701 is provided by the reference voltage terminal VREF (FIGS. 1, 4, and 6B). The OR gate 703 is operable for generating a selection signal SEL based on the charging control signal CHG and the discharging control signal DSC.

As shown in FIG. 3, the controller 180 further includes a multiplexer 390 operable for selectively delivering the error signal EA1 and the soft start signal SST1 to the buck control unit 320 based on the selection signal SEL. In operation, if a voltage of the soft start signal SST1 is less than the error signal EA1 when the first switch Q1 is turned on, then the multiplexer 390 selectively delivers the soft start signal SST1 to the buck control unit 320 based on the selection signal SEL, and the buck control unit 320 is operable for regulating the current of the first LED string 101 based on a voltage of the soft start signal SST1. When the first switch Q1 is turned off, the multiplexer 390 selectively delivers the soft start signal SST1 to the buck control unit 320 based on the selection signal SEL, and the buck control unit 320 is operable for regulating the current of the first LED string 101 based on the voltage of the soft start signal SST1. As a result, when the first switch Q1 is turned on or turned off, the current of the first LED string 101 changes gradually. Similarly, for the second LED string 102, when the second switch Q2 is turned on or turned off, the current of the second LED string 102 changes gradually. Advantageously, electromagnetic interference (EMI) caused by fast-changing current of the LED strings 101 and 102 can be reduced.

Figure 8:
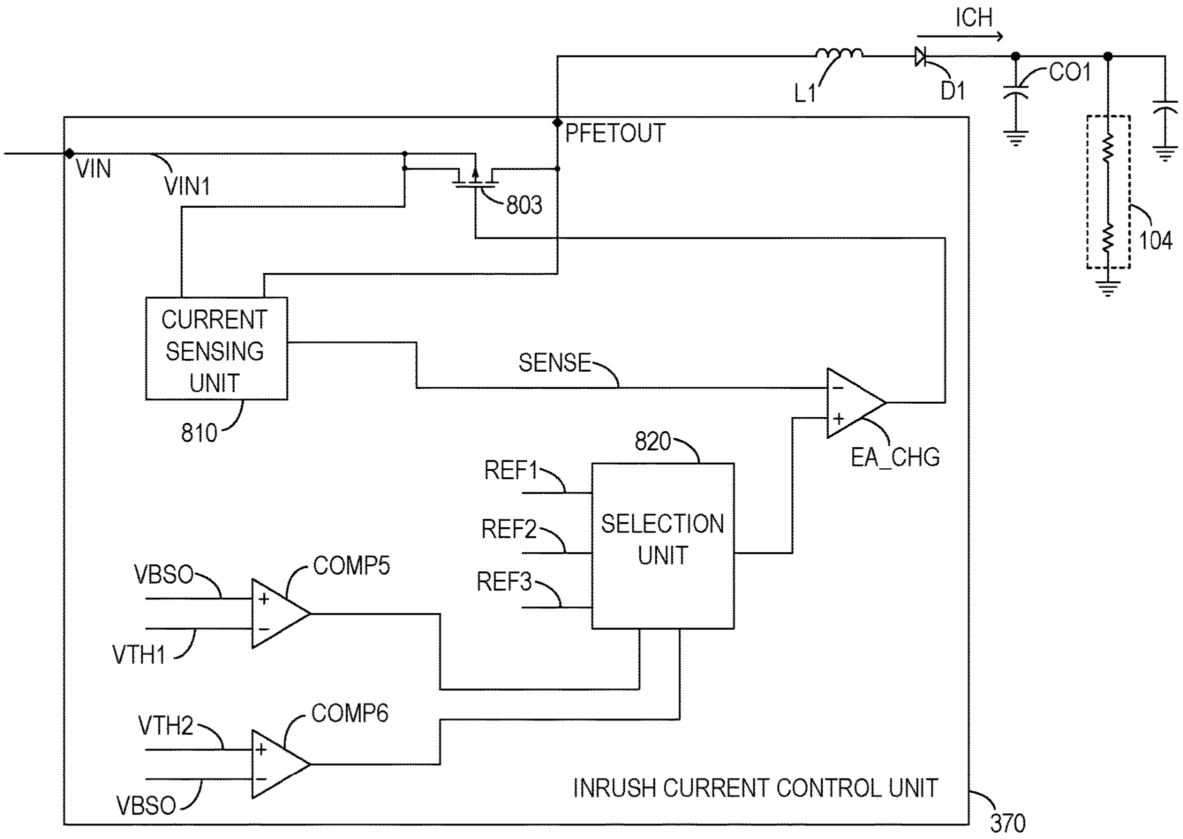
FIG. 8 shows a circuit diagram of an inrush current control unit in a controller for controlling a light source module, in accordance with embodiments of the present invention.

FIG. 8 shows a circuit diagram of the inrush current control unit 370, in accordance with embodiments of the present invention. The inrush current control unit 370 includes a comparator COMP5, a comparator COMP6, a selection unit 820, a current sensing unit 810, and an error amplifier EA_CHG. During a start-up phase of the boost converter, the power terminal PFETOUT provides a current ICH for charging the output capacitor CO1 of the boost converter, and the inrush current control unit 370 is operable for regulating the current ICH based on a voltage of the output voltage VBSO of the boost converter. In operation, the comparator COMP5 is operable for comparing the output voltage VBSO of the boost converter with a first threshold VTH1, and the comparator COMP6 is operable for comparing the output voltage VBSO of the boost converter with a second threshold VTH2. In one embodiment, the first threshold VTH1 and the second threshold VTH2 are proportional to a voltage VIN1 at the power terminal VIN, and VTH1 is less than VTH2. In one embodiment, VTH1 is equal to 0.8*VIN1, and VTH2 is equal to 0.4*VIN1. The selection unit 820 is operable for selecting a reference signal from multiple reference signals REF1, REF2, and REF3 based on an output of the comparator COMP5 and an output of the comparator COMP6, where REF1 is less than REF2, and REF2 is less than REF3. In one embodiment, if VBSO is less than VTH1, then the selection unit 820 selects REF1; if VBSO is greater than VTH1 and less than VTH2, then the selection unit 820 selects REF2; and if VBSO is greater than VTH2, then the selection unit 820 selects REF3. The current sensing unit 810 is operable for generating a sensing signal SENSE indicating a magnitude of the current ICH. The error amplifier EA_CHG is operable for controlling a transistor 803 coupled in series with the output capacitor CO1 to regulate the magnitude of the current ICH based on the sensing signal SENSE and the reference signal selected by the selection unit 820. As described above, the current ICH can be regulated to different levels according to the voltage of the output voltage VBSO of the boost converter during the start-up phase. Advantageously, the output capacitor CO1 can be charged relatively quickly without receiving an inrush current from the power terminal VIN that is too large. Accordingly, over-power consumption and an over-temperature condition can be avoided.

Referring to FIG. 1 and FIG. 3, the controller 180 includes a power limit unit 380. The power limit unit 380 is operable for controlling the boost converter to regulate output voltage VBSO of the boost converter to be below a voltage threshold, and controlling the boost converter to regulate the input current IPWR received by the controller 180 from the power source 150 to be below a current threshold. The power limit unit 380 includes a first error amplifier EA_V, a second error amplifier EA_I, and a selection unit 381. The first error amplifier EA_V is operable for comparing a voltage sensing signal BST1 indicating a level of the output voltage VBSO of the boost converter with a first threshold signal V1 indicating the voltage threshold (e.g., 2V). The second error amplifier EA_I is operable for comparing a current sensing signal ISEN2 indicating a magnitude of the input current IPWR with a second threshold signal V2 indicating the current threshold. The current sensing signal ISEN2 is generated by an amplifier 382 based on the sensing signals ISP1 and ISN1 received at the sensing terminals ISP and ISN.

Referring to FIG. 1, the sensing terminals ISP and ISN are coupled to the two ends of the sensing resistor RS, respectively. In the example of FIG. 1, the sensing resistor RS is coupled between the power source 150 and the controller 180, and the current sensing signal ISEN2 indicates a magnitude of the input current IPWR flowing from the power source 150 to the controller 180. The selection unit 381 is operable for selectively delivering an output of the first error amplifier EA_V and an output of the second error amplifier EA_I to the boost control unit 310. In operation, if the output voltage VBSO of the boost converter is greater than the voltage threshold (e.g., 2V), then the selection unit 381 selectively delivers the output of the first error amplifier EA_V to the boost control unit 310. Accordingly, the boost control unit 310 regulates the output voltage VBSO to be below the voltage threshold. If the output voltage VBSO of the boost converter is less than the voltage threshold, then the selection unit 381 selectively delivers the output of the second error amplifier EA_I to the boost control unit 310. Accordingly, the boost control unit 310 regulates the input current IPWR to be below the current threshold. Advantageously, the power consumption of the light source driving circuit 100, which includes the controller 180 and the light source module, can be monitored and controlled within a desired range, and the power source 150 (e.g., a battery) can be protected from being over-discharged.

In another embodiment, the power limit unit 380 is operable for controlling the boost converter to regulate the output voltage VBSO of the boost converter to be below a voltage threshold, and also for controlling the boost converter to regulate the output current IBSO of the boost converter to be below a current threshold. In this embodiment, as shown in FIG. 9, the sensing resistor RS is coupled between the diode D1 of the boost converter and the output capacitor CO1 of the boost converter to sense a magnitude of the output current IBSO of the boost converter. With such a configuration, referring to FIG. 3, the current sensing signal ISEN2 indicates a magnitude of the output current IBSO. In operation, if the output voltage VBSO of the boost converter is greater than the voltage threshold (e.g., 2V), then the selection unit 381 selectively delivers the output of the first error amplifier EA_V to the boost control unit 310. Accordingly, the boost control unit 310 regulates the output voltage VBSO to be below the voltage threshold. If the output voltage VBSO of the boost converter is less than the voltage threshold, then the selection unit 381 selectively delivers the output of the second error amplifier EA_I to the boost control unit 310. Accordingly, the boost control unit 310 regulates the output current IBSO to be below the current threshold.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller operable for controlling a light source module comprising a first Light-Emitting Diode (LED) string and a second LED string, said controller comprising:

a power input terminal, operable for receiving electric power from a boost converter;

a power output terminal, coupled to said light source module, operable for providing said electric power to said light source module through a buck converter;

a first input terminal, operable for receiving a first pulse width modulation (PWM) signal, wherein said first PWM signal is operable for controlling a first switch coupled in series with said first LED string, and wherein said first switch is on if said first PWM signal is in a first state and is off if said first PWM signal is in a second state;

a second input terminal, operable for receiving a second PWM signal, wherein said second PWM signal is operable for controlling a second switch coupled in series with said second LED string, and wherein said second switch is on if said second PWM signal is in said first state and is off if said second PWM signal is in said second state; and a width monitoring terminal, operable for receiving a width monitoring signal indicating a duration of said first state of said first PWM signal and a duration of said first state of said second PWM signal, wherein said controller is operable for turning off said light source module if said width monitoring signal is greater than a width threshold signal.

2. The controller of claim 1, further comprising:

a current sensing terminal, coupled to a sensing resistor, wherein said sensing resistor is coupled to a cathode of said first LED string through said first switch and to a cathode of said second LED string through said second switch, wherein said current sensing terminal is operable for receiving a current sensing signal from said sensing resistor, and wherein said current sensing signal indicates a current of said first LED string and a current of said second LED string, wherein said current of said first LED string flows from said buck converter through said first LED string, said first switch, and said sensing resistor to ground if said first switch is on, wherein said current of said second LED string flows from said buck converter through said second LED string, said second switch, and said sensing resistor to ground if said second switch is on.

3. The controller of claim 2, further comprising:

a first voltage sensing terminal, coupled to an anode of said light source module through a voltage divider, and operable for receiving a first voltage sensing signal indicating a voltage at said anode of said light source module; and a second voltage sensing terminal, coupled to said anode of said light source module, and operable for receiving a second voltage sensing signal indicating a voltage drop across said light source module, wherein said controller is operable for detecting a short-circuit condition based on said first voltage sensing signal, said second voltage sensing signal, and said current sensing signal.

4. The controller of claim 2, further comprising:

a dimming terminal, operable for receiving a third PWM signal, wherein said controller is operable for generating an analog signal based on said third PWM signal, and for regulating said current of said first LED string and said current of said second LED string by comparing said analog signal and said current sensing signal.

5. The controller of claim 4, further comprising:

an amplifier operable for comparing said analog signal and said current sensing signal to generate an error signal;

a soft start terminal, coupled to a capacitor, and operable for generating a soft start signal by charging and discharging said capacitor, wherein said controller is operable for regulating said current of said first LED string based on said soft start signal if a voltage of said soft start signal is less than said error signal when said first switch is turned on, and wherein said controller is operable for regulating said current of said first LED string based on said soft start signal when said first switch is turned off.

6. The controller of claim 1, further comprising:

a power terminal, coupled to an output capacitor of said boost converter, and operable for providing a current for charging said output capacitor, wherein said current is regulated according to a voltage at said power input terminal.

7. The controller of claim 1, further comprising:

a voltage sensing terminal, coupled to an output of said boost converter through a voltage divider, and operable for sensing an output voltage of said boost converter;

a first sensing terminal and a second sensing terminal, coupled to a sensing resistor, and operable for sensing an input current received by said controller from a power source, wherein said sensing resistor is coupled between said power source and said controller, and wherein said controller is operable for controlling said boost converter to regulate said output voltage to be below a voltage threshold, and for controlling said boost converter to regulate said input current to be below a current threshold.

8. The controller of claim 1, further comprising:

a voltage sensing terminal, coupled to an output of said boost converter through a voltage divider, and operable for sensing an output voltage of said boost converter;

a first sensing terminal and a second sensing terminal, coupled to a sensing resistor, and operable for sensing an output current of said boost converter, wherein said sensing resistor is coupled between a diode of said boost converter and an output capacitor of said boost converter, and wherein said controller is operable for controlling said boost converter to regulate said output voltage to be below a voltage threshold, and for controlling said boost converter to regulate said output current to be below a current threshold.

9. A controller operable for controlling a light source module comprising a first Light-Emitting Diode (LED) string and a second LED string, said controller comprising:

a boost control unit, operable for controlling a boost converter;

a buck control unit, operable for controlling a buck converter; and a brightness limit unit, operable for receiving a first pulse width modulation (PWM) signal and a second PWM signal, wherein said first PWM signal is operable for controlling a first switch coupled in series with said first LED string, and wherein said first switch is on if said first PWM signal is in a first state and is off if said first PWM signal is in a second state, wherein said second PWM signal is operable for controlling a second switch coupled in series with said second LED string, and wherein said second switch is on if said second PWM signal is in said first state and is off if said second PWM signal is in said second state, and wherein said brightness limit unit is operable for turning off said light source module if a width monitoring signal indicating a duration of said first state of said first PWM signal and a duration of said first state of said second PWM signal are greater than a width threshold signal indicating a width threshold.

10. The controller of claim 9, wherein said brightness limit unit comprises:

a switch coupled in parallel with a capacitor, wherein said switch is turned off to charge said capacitor if either said first PWM signal or said second PWM signal is in said first state, wherein said switch is turned on to discharge said capacitor if both said first PWM signal and said second PWM signal are in said second state, and wherein said width monitoring signal is a voltage across said capacitor;

a comparator operable for comparing said width monitoring signal with said width threshold signal; and a flip-flop operable for generating an alert signal based on an output of said comparator.

11. The controller of claim 9, further comprising:

a current sensing terminal, coupled to a sensing resistor, operable for receiving a current sensing signal indicating a current of said first LED string and a current of said second LED string, wherein said sensing resistor is coupled to a cathode of said first LED string and a cathode of said second LED string, wherein said current of said first LED string flows from said buck converter through said first LED string, said first switch and said sensing resistor to the ground, and wherein said current of said second LED string flows from said buck converter through said second LED string, said second switch, and said sensing resistor to the ground.

12. The controller of claim 11, further comprising:

a protection unit, operable for detecting a short-circuit condition based on a first voltage sensing signal, a second voltage sensing signal, and said current sensing signal, wherein said first voltage sensing signal indicates a voltage at an anode of said light source module, said second voltage sensing signal indicates a voltage drop across said light source module, and said current sensing signal further indicates a voltage at a cathode of said light source module, wherein said protection unit comprises:

a differential unit operable for generating a differential signal indicating a difference between said first voltage sensing signal and said current sensing signal;

a first comparator operable for comparing said differential signal and a first protection threshold;

a second comparator operable for comparing said current sensing signal and a second protection threshold;

a third comparator operable for comparing said second voltage sensing signal and a third protection threshold;

an OR gate operable for performing an OR operation of an output of said first comparator and an output of said third comparator;

an AND gate operable for performing an AND operation of an output of said OR gate and an output of said second comparator; and a timing unit operable for generating an alert signal based on an output of said AND gate, said first PWM signal, said second PWM signal, and a predetermined time duration.

13. The controller of claim 11, further comprising:

a dimming unit, comprising:

a first capacitor operable for generating an analog signal based on a third PWM signal, wherein said first capacitor is charged if said third PWM signal is in a first state, and is discharged if said third PWM signal is in a second state, and wherein a level of said analog signal is proportional to a duty cycle of said third PWM signal, wherein said controller is operable for regulating said current of said first LED string and said current of said second LED string by comparing said analog signal and said current sensing signal.

14. The controller of claim 13, wherein said dimming unit further comprises:

an amplifier operable for generating a current for charging said first capacitor based on a setting signal, wherein said setting signal is generated by a voltage divider based on a reference voltage signal provided by a reference voltage terminal of said controller.

15. The controller of claim 13, further comprising:

an amplifier for comparing said analog signal and said current sensing signal to generate an error signal;

a soft start unit, operable for generating a soft start signal by charging and discharging a second capacitor, wherein said soft start signal is a voltage across said second capacitor, and wherein said soft start unit comprises:

a discharging unit, operable for generating a discharging control signal based on said first PWM signal and said second PWM signal;

a comparator, operable for comparing said error signal with said soft start signal;

a flip-flop, operable for generating a charging control signal based on an output of said comparator; and an OR gate, operable for generating a selection signal based on said charging control signal and said discharging control signal, wherein said charging control signal is operable for turning on a third switch to charge said second capacitor, and wherein said discharging control signal is operable for turning on a fourth switch to discharge said second capacitor, wherein said controller further comprises a multiplexer operable for selectively delivering said error signal and said soft start signal to said buck control unit based on said selection signal, wherein said buck control unit is operable for regulating said current of said first LED string based on said soft start signal if a voltage of said soft start signal is less than said error signal when said first switch is turned on, and wherein said buck control unit is operable for regulating said current of said first LED string based on said soft start signal when said first switch is turned off.

16. The controller of claim 9, further comprising:

a power terminal, coupled to an output capacitor of said boost converter, operable for providing a current for charging said output capacitor;

an inrush current control unit, operable for regulating said current based on an output voltage of said boost converter, wherein said inrush current control unit comprises:

a first comparator operable for comparing said output voltage of said boost converter with a first threshold;

a second comparator operable for comparing said output voltage of said boost converter with a second threshold;

a selection unit operable for selecting a reference signal from a plurality of reference signals based on an output of said first comparator and an output of said second comparator;

a current sensing unit operable for generating a sensing signal indicating said current; and an error amplifier operable for controlling a transistor coupled in series with said output capacitor to regulate said current based on said sensing signal and said reference signal selected by said selection unit.

17. The controller of claim 9, further comprising:

a power limit unit, operable for controlling said boost converter to regulate an output voltage of said boost converter to be below a voltage threshold, and for controlling said boost converter to regulate an input current received by said controller from a power source to be below a current threshold, wherein said power limit unit comprises:

a first error amplifier operable for comparing a voltage sensing signal indicating said output voltage of said boost converter with a first threshold signal indicating said voltage threshold;

a second error amplifier operable for comparing a current sensing signal indicating said input current with a second threshold signal indicating said current threshold; and a selection unit operable for selectively delivering an output of said first error amplifier and an output of said second error amplifier to said boost control unit.

18. The controller of claim 9, further comprising:

a power limit unit, operable for controlling said boost converter to regulate an output voltage of said boost converter to below a voltage threshold, and for controlling said boost converter to regulate an output current of said boost converter to below a current threshold, wherein said power limit unit comprises:

a first error amplifier operable for comparing a voltage sensing signal indicating said output voltage with a first threshold signal indicating said voltage threshold;

a second error amplifier operable for comparing a current sensing signal indicating said output current with a second threshold signal indicating said current threshold; and a selection unit operable for selectively delivering an output of said first error amplifier and an output of said second error amplifier to said boost control unit.

* * * * *